United States Patent [19]

Scott

[11] Patent Number: 5,495,609

[45] Date of Patent: Feb. 27, 1996

[54] SYSTEM AND METHOD FOR MANAGING CONCURRENT ACCESS TO DATA FILES CONSISTING OF DATA ENTRIES REFERENCED BY KEYS COMPRISING SEQUENCE OF DIGITS

[75] Inventor: Jonathan A. Scott, Hants, Great Britain

[73] Assignee: International Business Machines Corporation, Armonk, N.Y.

[21] Appl. No.: 474,529

[22] Filed: Jun. 7, 1995

Related U.S. Application Data

[63] Continuation of Ser. No. 932,097, Aug. 19, 1992, abandoned.

[30] Foreign Application Priority Data

Feb. 3, 1992 [GB] United Kingdom .................. 9204450

[51] Int. Cl.$^6$ ................................................. G06F 17/30
[52] U.S. Cl. .................. 395/600; 395/427; 364/DIG. 1; 364/252.4; 364/282.1; 364/282.3; 364/283.1; 364/283.2; 364/963; 364/974; 364/DIG. 2
[58] Field of Search .................................. 395/600, 650, 395/700, 425

[56] References Cited

U.S. PATENT DOCUMENTS

| | | | |
|---|---|---|---|
| 4,606,002 | 8/1986 | Waisman et al. | 364/200 |
| 4,677,550 | 6/1987 | Ferguson | 395/600 |
| 5,151,988 | 9/1992 | Yamagishi | 395/600 |
| 5,247,684 | 9/1993 | Tavares et al. | 395/700 |

FOREIGN PATENT DOCUMENTS 303231 2/1989 European Pat. Off. ........ G06F 15/40

OTHER PUBLICATIONS

D. Ferguson "Bit-Tree: A Data Structure for Fast File Processing" Comm. ACM, vol. 35, No. 5, pp. 115–120, Jun. 1992.
IBM Tech. Disc. Bulletin, vol. 25, No. 1, Jun. 1982 "Digital B-Trees", A. K. Chandra and D. B. Lomet.
IBM Tech. Disc. Bulletin, vol. 32, No. 8A, Jan. 1990 "Certification with Adaptive Time Stamp Selection", D. M. Dias, and P. S. Yu.
IEE Transactions on Software Engineering, vol. 15, No. 6, Jun. 1989 "On Distributing JASMIN's Opt. Multi. Page Manager".
ACM Transactions on Database Systems, vol. 6, No. 4, Dec. 1981 "Efficient Locking for Concurrent Operations on B-Trees".
Chandra et al "Digital B-Trees" IBM TDB vol. 25, No. 1 pp. 106–109, 1982.
D. Comer "The Ubiquitous B-Tree" Computing Surveys vol. 11, No. 2, pp. 121–136, Jun. 1979.

*Primary Examiner*—Thomas G. Black
*Assistant Examiner*—Peter Y. Wang
*Attorney, Agent, or Firm*—William A. Kinnaman, Jr.

[57] ABSTRACT

A database management system including an index with parallel read access for large amounts of keyed information. The index can be referenced for read-only access by any number of simultaneous processes in parallel with being updated by a single process where the read-only access does not involve any locking or waiting.

17 Claims, 4 Drawing Sheets

SYSTEM AND METHOD FOR MANAGING CONCURRENT ACCESS TO DATA FILES CONSISTING OF DATA ENTRIES REFERENCED BY KEYS COMPRISING SEQUENCE OF DIGITS

This application is a continuation of application Ser. No. 07/932,097, filed Aug. 19, 1992 now abandoned.

FIELD OF THE INVENTION

The invention relates to data processing and more specifically to managing concurrent access of data files consisting of key referenced data entries.

BACKGROUND OF THE INVENTION

A database management system controls access to databases containing many records of data. For many applications there is a need to search such data for a record matching a key. A sorted index can be built using a tree structure. Two of the tree structures commonly used are the B-tree and the digital tree. A general introduction to the B-tree and the digital tree can be found in "The Art of Computer Programming", Knuth, volume 3, "Sorting and Searching", pages 473–499.

In a B-tree nodes are connected by a series of pointers. The nodes hold a series of ordered key numbers and the nodes at any one level are ordered themselves. Searching is done by moving from a root node at the top of the tree down to the next lower level in the hierarchy via a pointer and performing a comparison between the search key and the key numbers at the node. This is repeated until a leaf node (or descriptor) containing just keys corresponding to individual records is reached.

In a digital tree the key is represented by a sequence of digits which are tested at successive lower ranking nodes. As in the B-tree, nodes are connected by pointers, but the nodes have a leading key value for the digits of the key tested at higher level nodes and pointers to lower levels corresponding to each possible digit value of the digit currently being tested. In a B-tree, re-arrangement of the tree may be necessary after insertion or deletion of a node, since all nodes must have between n/2 and n keys associated with them, where n is the order of the B-tree. This may ripple all the way up a tree when a change is made at a leaf node. Re-arrangement in a digital tree is only necessary when an entry at a node is the only entry left at that node and then the re-arrangement is a very simple one. A digital tree does however use more storage for a given set of key referenced data entries than a B-tree.

Concurrent access to the records of data has, in the past, been achieved by a number of techniques such as locking the database to prevent information from being changed while it is being retrieved or causing a process to wait until the database is free. However previous techniques in this area have generally suffered from at least one of the following limitations:

1. Only random access to specific keyed information identified by a full length key was supported (for example using a hash table).

2. Reading and writing tasks had to use some form of locking technique to prevent information from being changed while it is being retrieved. This violates the requirement of read-only storage access for reading processes, and means that a reading process has to have some method of suspending itself to wait for information to become available.

3. The index structure was similar to a list or unbalanced binary tree and could only provide efficient access to small amounts of data, because the overheads increased approximately linearly with the number of entries in the index.

PRIOR ART

European patent application EP 0 303 231 A2 describes concurrent access to a data file using a change counter or time stamp located at each node of a B-tree. As a process accesses a node it locks it (and all nodes descended from it) so other processes only have concurrent access to parts of the tree not being used by this process. The process moves down the tree, a level at a time, checking the node time stamp against a search time stamp obtained before the search was started, until a leaf node is reached or the node time stamp is later than search time stamp, in which case the process restarts the search, with the consequent loss in search efficiency.

European patent application EP 0 314 292 A2 achieves concurrent access by restricting access to nodes. When one user is inserting or deleting a key and its associated record, all accesses to a node being traversed by this user and the immediately traversed node are limited to read access by other users. At the leaf node, all accesses by others to the key and record being added or deleted are prevented together with accesses to the next successively located record key and its associated record with the consequent necessity for processes to be able to suspend themselves while waiting for access to the nodes and leaves.

SUMMARY OF THE INVENTION

The disadvantages of the prior art are overcome, according to the invention, by providing a computer data storage management system for managing concurrent access to data files consisting of key referenced data entries, the system including an index to each data file comprising a tree structure of index nodes, hierarchically arranged according to the key structure and including at least downward pointers to lower ranking nodes or to data entries of the data files; an index modifying means for modifying the index tree to reflect changes in data entries; a change indication means arranged to provide an indication of predetermined types of modifications of the index tree or of a part thereof; and index search means for searching the index for a node containing a pointer to a user supplied key in order to permit the reading of the data entry to which the user supplied key refers, operation of the index search means being connected with the change indication; characterised in that said tree structure of index nodes is a digital tree structure; and that the system further includes means for examining the change indication and for causing the index search means to repeat a search if a change was indicated during the search.

The invention also provides a method of managing concurrent access to stored computer data files consisting of key referenced data entries, said method comprising the steps of; building an index to each data file comprising a tree structure of index nodes, hierarchically arranged according to the key structure and including at least downward pointers to lower ranking nodes or to data entries of the data file; modifying the index as necessary to reflect changes in data entries; providing a change indication indicating the occurrence of predetermined types of modifications of the index tree or of a part thereof; searching the index for a node containing a pointer to a user supplied key in order to permit reading of the data entry to which the user supplied key refers, the validity of the search being determined by the change indication; characterised by the further steps of; building said index as a digital tree structure; and examining whether a change indication was provided during the search and, if so, repeating the search of the index.

The use of a digital tree index minimizes changes necessary to the index when the data files are updated so that changes are far less likely to have occurred during a search than is the case for a B-tree. Thus a simple retrospective check for changes does not represent a significant performance overhead. Also there is no need to lock the tree.

Any one of a number of index digit base values may be chosen. A base 2 tree always uses a predictable amount of storage (one node per key) and gives fairly predictable performance characteristics regardless of the distribution of key values, but it is the least efficient form of digital tree for performance. A base 4 tree has been shown through theoretical analysis and practical tests on a prototype index routine to generally use more storage than the base 2 version but gives poor performance compared with a base 16 version. This is effectively the worst of both worlds, so base 4 is not used in practice. However it is described later for ease of illustration. In practice base 16 is preferred. It can reduce the number of index levels by a factor of three or more, giving significant reductions in retrieval path length and providing efficient access to large amounts of data. It generally requires a little more index storage than base 2 for random keys, and significantly more for worst case key distributions, but for densely clustered keys such as consecutive character decimal or binary numbers it can be very efficient in storage. A base 256 tree requires such a large node size that its storage requirements for anything except dense binary trees would be unacceptably large.

The only differences between the embodiments of trees of the various bases are the details of the memory structures of the nodes and the detailed manipulation of the data.

BRIEF DESCRIPTION OF THE DRAWING

An embodiment of the invention will now be described, by way of example, with reference to the accompanying drawings, in which.

DETAILED DESCRIPTION OF A PREFERRED EMBODIMENT OF THE INVENTION

The invention relates to the provision of an index for a database which allows read access in parallel with updating of the database.

Figure 1:
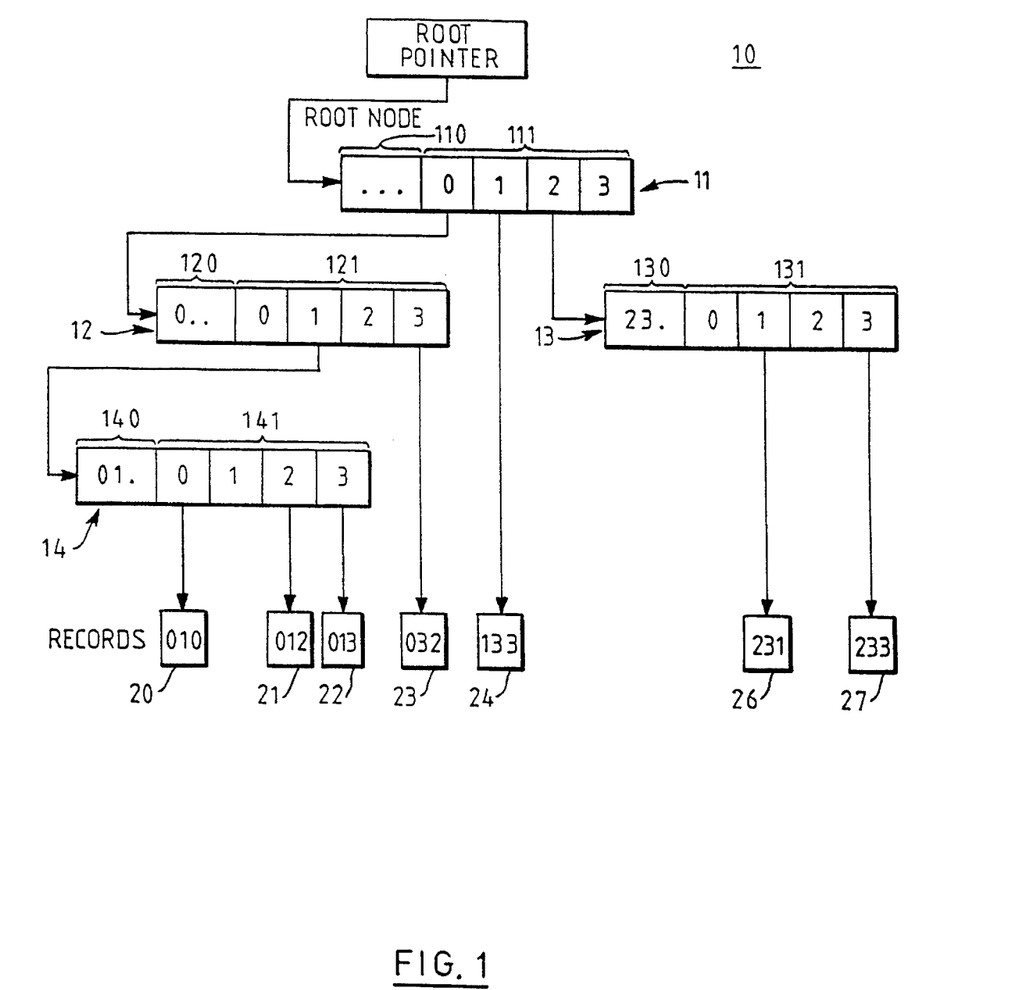
FIG. 1 is an example of a base 4 digital tree used in the index of the present embodiment.

FIG. 1 is an example of a base 4 digital tree containing seven entries. The base 4 is chosen for ease of illustration and, in practice, a base 16 tree is preferred. It will also be realized that a practical database would have many more entries.

The keys are written out as a sequence of base 4 digits. Each index node (11, 12, 13, 14) contains a leading key value (110, 120, 130, 140) and four pointers to lower levels corresponding to each possible digit value (111, 121, 131, 141). Each pointer may point to another node, or to an entry, or it may contain a null value indicating that there is no matching entry. Each index node also contains a pointer back to the node which points to it (except for the highest level node) to allow efficient sequential retrieval and deletion.

Table 1 shows the structure of an index node. The structure is implemented in storage which would probably be in main memory and for the example shown would require 28 bytes of memory for each node. Each node represents a point in the tree where all entries at that level or below share the same leading key up to the index digit associated with that node, but differ in that digit position. The node contains information to identify the byte and bit position of the relevant index digit, plus a reference to the leading key and a vector of downwards pointers to other nodes or leaves (descriptors) (20, 21, 22, 23, 24, 26, 27), indexed by the possible values of the index digit.

TABLE 1

Example of an index node structure in memory

| Type | Name | Description |
|---|---|---|
| Unsigned byte | NODEFLAG | Flag to distinguish an active node from a free node |
| Unsigned byte | NODEBYTE | Leading digits in index byte for this node, shifted right so index digit is last digit |
| Unsigned byte | NODEOFFS | Offset of index byte from start of key |
| Unsigned byte | NODEBITS | Power of 2 (shift) for digit within byte |
| Address (4 bytes) | NODEDESC | Address of descriptor for leading key |
| Address (4 bytes) | NODEUP | Upward pointer to previous index level |
| Address (4 bytes) | NODEDOWN(0) | Downwards pointers (one for each position in node, that is four for a base 4 tree) |
| Address (4 bytes) | NODEDOWN(1) | |
| Address (4 bytes) | NODEDOWN(2) NODEDOWN(3) | |

The first six lines in the table show the type of information stored in the Index Node Data Areas (110, 120 etc.) in FIG. 1. The last four lines of the table represent the Index Node Pointer Areas (111, 121 etc.) in FIG. 1. The contents of the index nodes for the embodiment of FIG. 1 are shown in the following table.

TABLE 2

Index node structure for the base 4 tree of FIG. 1

| Name | Node | | | |
|---|---|---|---|---|
| | ... | 0.. | 01. | 23. |
| NODEFLAG | 80 | 80 | 80 | 80 (hex digits) |
| NODEBYTE | 0000 | 0000 | 0010 | 0230 (base 4 digits) |
| NODEOFFS | 00 | 00 | 00 | 00 (hex digits) |
| NODEBITS | 06 | 04 | 02 | 02 |

TABLE 2-continued

Figure 2:
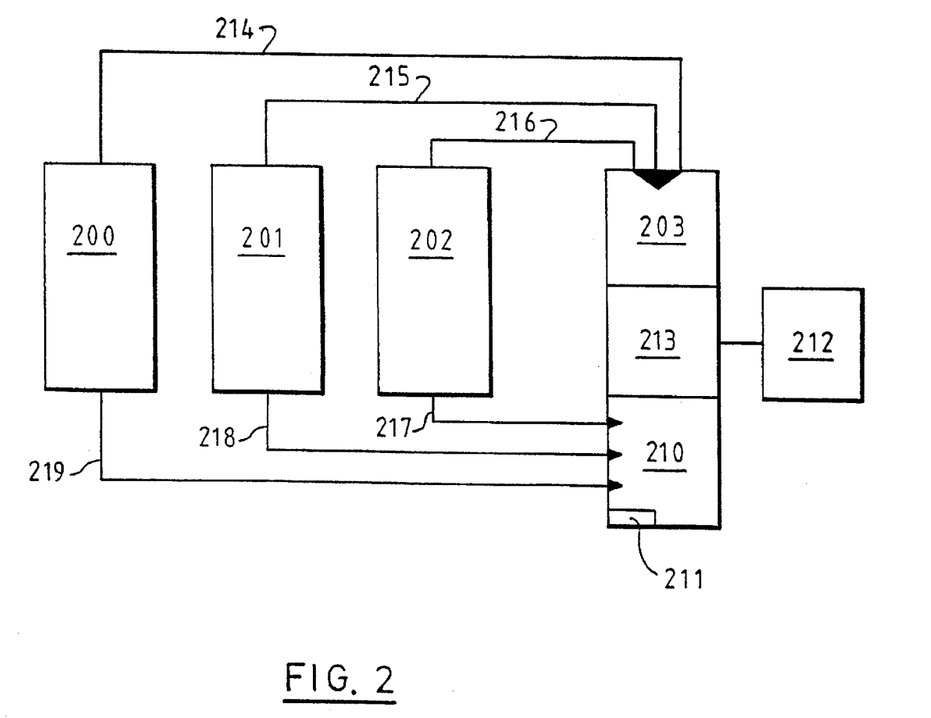
FIG. 2 is a diagram of a computer data storage management system with a change counter.

|  | The following are all pointers | | | (hex digits) |
| --- | --- | --- | --- | --- |
| NODEDESC | 0.. | 01. | 010 | 231 |
| NODEUP | 0 | ... | 0.. | ... |
| NODEDOWN(0) | s0.. | 0 | 010 | 0 |
| NODEDOWN(1) | 133 | s01. | 0 | 231 |
| NODEDOWN(2) | s23. | 0 | 012 | 0 |
| NODEDOWN(3) | 0 | 032 | 013 | 233 | s indicates top bit set
Note: NODEBYTE is expressed in base 4 digits for clarity FIG. 2 shows a computer data storage management system including data tables, a change counter and processes having access to the data table. Data tables (210) are part of file management services, allowing data to be held in memory. A data table is a copy of a file (212), or part of a file, of key referenced data entries loaded in to memory via a buffer (213) by the process (203) or operating system to reduce the need for repeatedly accessing DASD (Direct Access Storage Device). The process (203) or operating system can access data tables very quickly, improving the performance and speed of the process.

Advantages of data tables include fast, efficient access to data, since data is read from the table in memory, avoiding the delays and overhead of access to DASD; significant reduction in CPU (central Processor Unit) usage since reduced access to DASD results in a reduction in processor usage, leaving the processor free for other tasks; reduced program path lengths and internal response times as a result of the reduction in I/O processing; and increased throughput since the improved internal response times lead to a lowering of the number of transactions in the system at one time and so allow considerable growth in the number of transactions.

A Shared Data Table is where a data table held in a data space where it can be shared by transactions from the same process (203) or other processes (200, 201, 202) running under the same operating system. Additional benefits over simple data tables include further reductions in access to DASD, further improvements in internal response times, further savings in I/O, increased integrity since the data table is outside the process's address space and is less vulnerable to corruption and also increased security of data.

Index management routines build and maintain an index (in a digital tree form) which is used to locate keyed entries in storage. The entries are record descriptors that point to records. The records have a field which is used as a key field.

Retrieval requests including insert or delete requests (214, 215, 216) which modify the index can be executed concurrently with read-only requests. If a retrieval request made use of the information which was modified while the request was in progress, the results would be unpredictable, so some form of validation is necessary.

Validation for concurrent access is provided by a table-related change counter (211). Other means for indicating a change or changes could be used. The general principle of the concurrent access rules is that whenever anything in the table has significantly changed, but before any data affecting previous requests has been made invalid, the change counter is incremented to indicate that any retrieval request which is in progress at that point should be restarted. A significant change for this purpose may be just a deletion, or it may be an insertion, replacement or deletion. It should be noted that neither locking of a node or nodes, nor any requirement for a process to wait, is required.

Read-only requests (217, 218, 219) from other processes (200, 201, 202) can be processed concurrently with change activity from the owning process (203). The implementation must ensure that the results of retrieval by other processes are reliable and consistent. Errors or data damage caused by concurrent changes must be prevented and consistency checks are required to ensure that results reflect the state of the file at some instant in time and do not for example contain a mixture of old and new data. In order to achieve this, storage which was at any time valid for fetch access by the caller must remain accessible even after the contents are obsolete. This generally means that storage areas must not be released back to the operating system but should be retained and reused if possible. Also, all changes to the tree index structure must be performed in such a way that valid access is possible at all times. One example is that a pointer to a new object must not be stored before the object is made valid. Information that cannot be updated by a single instruction (such as a key or record value) must be updated by building the new value in a new area then switching a pointer or descriptor. An indication that the old area is invalid must then be set before it is reused for any other purpose, and the reading task must check this indicator after using the area to determine whether the results were valid.

It has been assumed that the frequency of incrementing of the change counter (211) will never be sufficiently high to be worth using a more complex scheme with a finer level of granularity, as even a single change to the file has a considerably longer path length through the owning process than a read, and multiple consecutive changes to the same data table could not be performed sufficiently rapidly to cause a significant percentage of retries, even for a process with much lower priority. Actual retry rates have been investigated and have validated this assumption. An alternative design with multiple change counters could be implemented if the number of retries was large.

A copy of the change counter is loaded into a register at the start of the retrieval operation, during table validation, and the register is compared with the change counter on completion of a search. If the counter has changed, any effect of the retrieval operation such as insertion of a node is cancelled and the operation is restarted. In particular, if an output key was returned, it is reset to zero, and if part or all of a record was returned, that length of storage is cleared to zero but the rest of the buffer is left unchanged. While a table remains open, any piece of storage which was ever used as an index node for that table must be either an active index node for the same table (possibly reused) or a free index node. If any node has been reused or freed since the start of the current request, the change counter will have been incremented.

The change counter is checked in the following cases:

Whenever the results of a change could cause an attempt to access an invalid storage location, for example because of using a length or offset which is invalid in combination with a particular pointer. The check is done after loading the relevant information into a register but before it is used.

At least once per iteration of any loop which does not have a predetermined limit to its number of iterations. This is to eliminate the possibility of an infinite loop (without needing to try to determine whether the tree structure update algorithms could ever lead to an apparent loop).

After a provisional decision has been taken to return an exception code indicating that an error has occurred in accessing the table but before it has actually been returned. This is just in case the apparent error could have been caused by a change to the table during processing, in which case a retry might be successful.

After returning results to the calling process, before terminating. If a change is found to have occurred, the original results must be nullified before the retry attempt.

Before any final irreversible action (such as storing a new value over an input field) after the data to be used for that action has been protected by loading it into a register.

Optionally between stages of a request which will require different nullification actions, so only the relevant actions are performed. As a change detected at a later stage must nullify the earlier results anyway, only the last such check is actually required.

The change counter is updated in the following cases:

After a pointer or reference to some object has been invalidated but before the old information to which it points is released or overwritten. This would occur when an entry was deleted.

Optionally after a new pointer has been stored, to alert current readers to the presence of new information or after a pointer or reference to some object has been changed. This is not really necessary for integrity, but ensures that a request which starts before the instant that a record was added and ends after it has been added will always be aware of the added record. This rule makes it easier to be sure of consistency in more complex situations.

Searching for an Entry in the Index

When the index is to be searched for an entry having a specified key value (the search key), the root node (11) is searched for a downwards pointer corresponding to the first digit of the key. This pointer may be a null pointer (the search terminates unsuccessfully), a pointer to a leaf (the search goes to the leaf and terminates successfully) or a pointer to a lower ranking node. If the pointer is to a lower ranking node, the search proceeds to the lower ranking node. The search key may have multiple bytes, each byte may contain one or more digits of the search key (in the case of a base 4 tree, each byte will contain 4 digits of the key).

In more detail at each node the following steps are completed:

If there are one or more whole bytes of leading key between the part checked at the higher level and the new node being checked, then compare them with the corresponding positions in the search key. If they are not equal, the search key is not found.

Using NODEBYTE and NODEOFFS (described in Table 1) the correct byte and bits of the search key for this node are found.

The correct bytes and bits of the search key are then used to index into the table of down pointers and the pointer examined. If the pointer is negative (top bit set), the pointer is to a node and the search moves to the lower ranking node. If the pointer is 0, there is no current match for the specified key, and this is where a new entry with this key could be inserted. If the pointer is positive, a leaf has been found that matches the digits of the key tested so far, so the entry is compared with the entire search key to see if it is an exact match or the best match. The ability to find a best match can be used to allow an imprecise search key to be specified.

As an example a search for an entry with a key 012 (record 21) in the tree of FIG. 1 will be described. The search commences at the root node (11). The search key actually used has a trailing zero added, so in this case is 0120. There are no whole bytes of leading key, so NODEBYTE and NODEOFFS is used to find the digit in the search key by shifting the key six bits to the right (NODEOFFS is 6 for this node). This gives 0, which is used to index into the table of downwards pointers (111). The downwards pointer points to a node (12) whose leading key is 0.., so the search moves to node (12). There is still no whole byte of leading key, so the original search key is shifted 4 bits to the right (NODEOFFS is 4 for this node). This gives 1, which is used to index into the table (121) of downwards pointers. The downwards pointer points to a node (14) whose leading key is 01.., so the search now moves to node 14. The shift and index is repeated, the downwards pointer found pointing to leaf node 012 (21) contents.

Replacing an Entry in the Index

If an existing entry is to be replaced by a new entry, the only action required is normally to switch the appropriate pointer e.g. 121, 131 in the lowest level index node to refer to the new entry. However, if the key value in the old entry was being used as a leading key copy for the current node or a higher level node in its tree, it is also necessary to switch that pointer as well. The change counter (211) does not need to be updated for the index to remain consistent.

Inserting New Entries in the Index

When a new entry is introduced into the index, it can often simply be inserted in a single operation into a previously unused array element in an existing node which already tests the correct digit. However, there may not be an existing node which tests on the particular digit in which it differs from the nearest existing key, and in this case it is necessary to insert a new node first.

When a new node is built, it initially only contains an array element referring to the existing lower level entry or node, so that the logical state of the index is unchanged by the introduction of the new node. While the new node is being connected into the index, the upwards and downwards references may be temporarily inconsistent with one another, but as the information in the new node merely duplicates the existing index information, it does not matter whether the new or old information is used at any given moment.

After a new node is connected in, index consistency does not require that the change counter be updated. However the change counter may be updated, to notify any reading process referring to the superseded version of the node that it should retry to obtain the latest data. The effect of this is that a request, which started before a new entry was inserted and finished after it was inserted, finds the new entry, so the new entry effectively appears at the same instant as observed by all processes. After a new node has been connected in, the new entry can be inserted into it in exactly the same way as for an existing node, so it becomes visible in a single operation.

Figure 3:
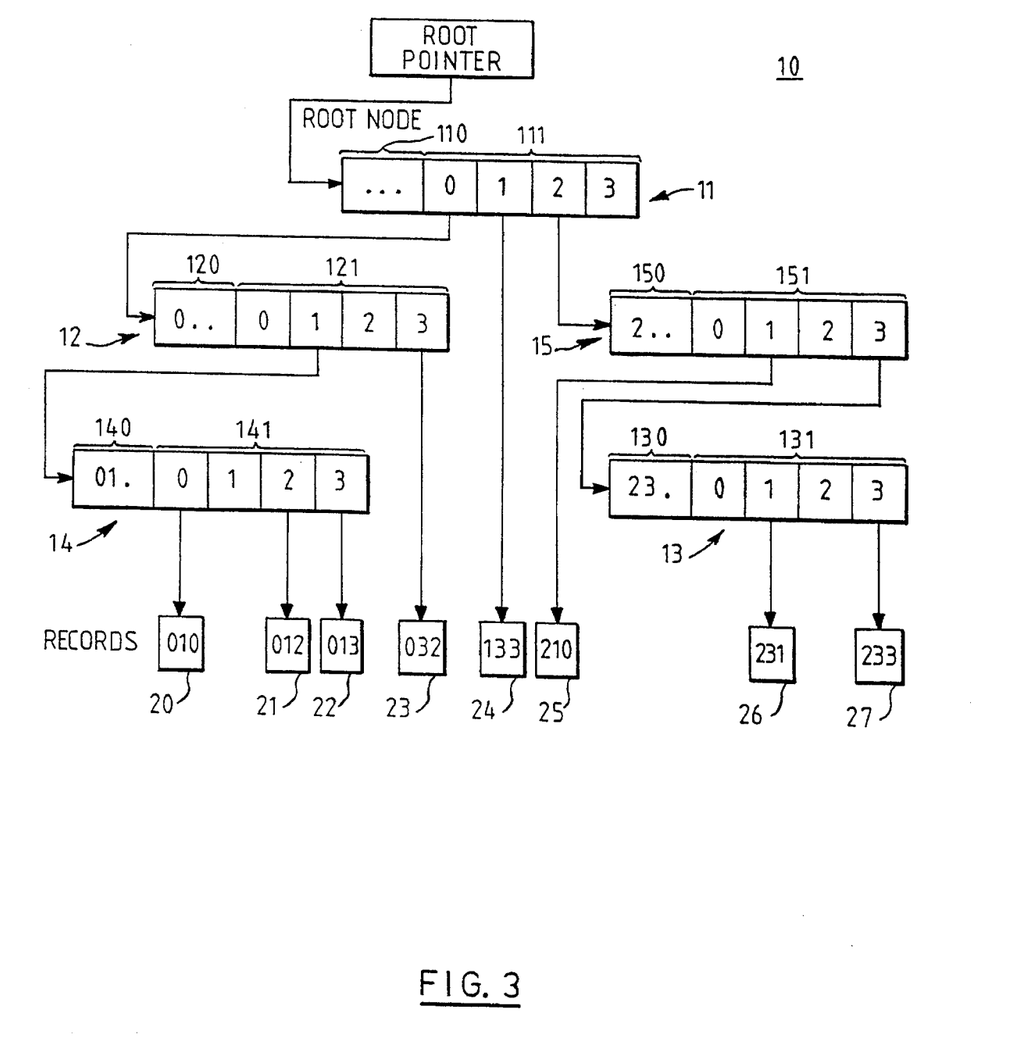
FIG. 3 is the example of FIG. 1 after the insertion of an entry requiring a new node to be added.

FIG. 3 shows the base 4 digital tree of FIG. 1 with a new entry (25) with a key 210 added to the tree. There is no previously unused array element in an existing node (13) which already tests for this digit. There is also no existing node that tests on the particular digit in which it differs from the nearest existing key, and so it is necessary to insert a new node (15). The node is built, initially containing just a reference to the existing node with leading key 23.. It is then connected in by updating the upward pointer from node (13) and the pointer from node (11). The change counter (211 in FIG. 2) may be updated if desired to notify any reading process that it should retry. The new entry is then inserted into the node, just as for an existing node, so that it becomes visible in a single operation.

The contents of the index nodes after the insertion of a new node and entry are:

TABLE 3

Index node structure for the example of FIG. 3

| Name | Node | | | | |
|---|---|---|---|---|---|
| | ... | 0.. | 01. | 23. | 2.. |
| NODEFLAG | 80 | 80 | 80 | 80 | 80 |
| NODEBYTE | 0000 | 0000 | 0010 | 0230 | 0000 |
| NODEOFFS | 00 | 00 | 00 | 00 | 00 |
| NODEBITS | 06 | 04 | 02 | 02 | 04 |
| The following are all pointers | | | | | |
| NODEDESC | 0.. | 01. | 010 | 231 | 23. |
| NODEUP | 0 | ... | 0.. | 2.. | ... |
| NODEDOWN(0) | s0.. | 0 | 010 | 0 | 0 |
| NODEDOWN(1) | 133 | s01. | 0 | 231 | 210 |
| NODEDOWN(2) | s23. | 0 | 012 | 0 | 0 |
| NODEDOWN(3) | 0 | 032 | 013 | 233 | s23. | s indicates top bit set

Deleting Old Entries from the Index

When an entry is being deleted from the index, the first action is to clear the pointer to the entry from the lowest level node, then the change counter must be updated to notify any reading process that a change has occurred.

If the key in the entry was being referred to for the leading key in the current index node or a higher level index node, the leading key pointer must be changed to refer to some other entry which is still present in the index below the relevant node level.

After an entry has been deleted, the index may then contain a redundant node which has only one downwards branch. In this case, the node may be removed from the tree and made available for reuse, provided that fetch access to the storage is still possible and that it is only reused for other information in the same index node format. If the redundant node has another node below it, the upwards pointer in that node must be changed to bypass the node as well as the downward pointer in the higher level node. It does not matter in what order these changes are done, as the information in the index is the same whether or not the redundant node is accessed.

Before a redundant node can be made invalid and eligible to be reused, the change counter must be updated again, to ensure that any reading process which might have been positioned on that node will realise that it has to retry its retrieval request.

Figure 4:
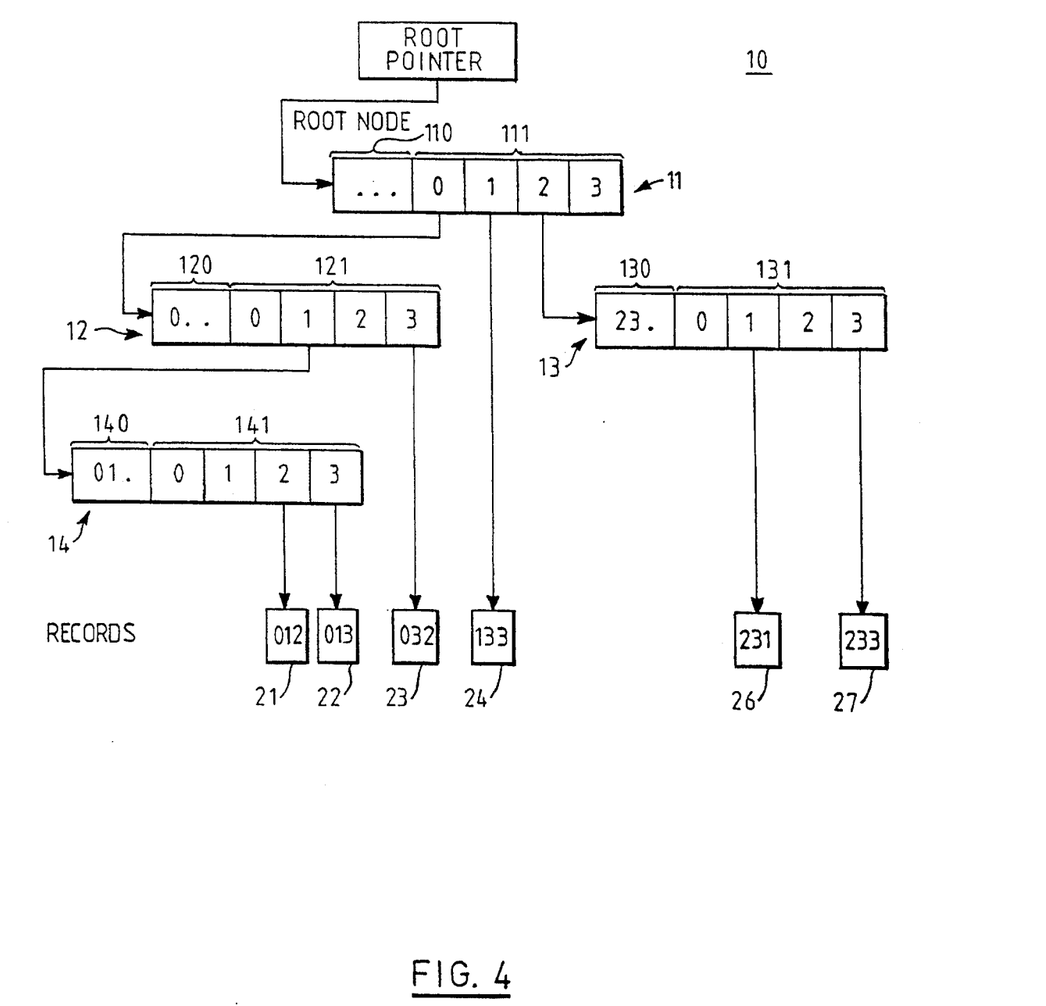
FIG. 4 is the example of FIG. 1 after deletion of an entry not requiring a node to be deleted.

FIG. 4 shows the base 4 digital tree of FIG. 1 with the entry (20) with a key 010 deleted from the tree. The entry is being referred to for the leading key of node 01. (140), so the leading key pointer must be changed to refer to the entry 012 (21). The change counter (211) is updated to notify any reading process that it should retry.

The contents of the index nodes after the deletion of the entry would be:

TABLE 4

Index node structure for the example of FIG. 4

| Name | Node | | | |
|---|---|---|---|---|
| | ... | 0.. | 01. | 23. |
| NODEFLAG | 80 | 80 | 80 | 80 |
| NODEBYTE | 0000 | 0000 | 0010 | 0230 |
| NODEOFFS | 00 | 00 | 00 | 00 |
| NODEBITS | 06 | 04 | 02 | 02 |
| The following are all pointers | | | | |
| NODEDESC | 0.. | 01. | 012 | 231 |
| NODEUP | 0 | ... | 0.. | ... |
| NODEDOWN(0) | s0.. | 0 | 0 | |
| NODEDOWN(1) | 133 | s01. | 0 | 231 |
| NODEDOWN(2) | s23. | 0 | 012 | 0 |
| NODEDOWN(3) | 0 | 032 | 013 | 233 | s indicates top bit set

Now that the details of the replacement, deletion and insertion of entries for a base 4 tree have been described, it will be clear what is necessary in order to extend this to a base 16 tree with many more entries. Such a structure in memory is shown in Table 5.

TABLE 5

Example of an index node structure in memory for a base 16 tree

| Type | Name | Description |
|---|---|---|
| Unsigned byte | NODEFLAG | Flag to distinguish an active node from a free node |
| Unsigned byte | NODEBYTE | Leading digits in index byte for this node, shifted right so index digit is last digit |
| Unsigned byte | NODEOFFS | Offset of index byte from start of key |
| Unsigned byte | NODEBITS | Power of 2 (shift) for digit within byte |
| Address (4 bytes) | NODEDESC | Address of descriptor for leading key |
| Address (4 bytes) | NODEUP | Upward pointer to previous index level |
| Address (4 bytes) | NODEDOWN(0) | Downwards pointers (one for each position in node, that is sixteen for a base 16 tree) |
| Address (4 bytes) | NODEDOWN(1) | |
| Address (4 bytes) | NODEDOWN(2) | |
| Address (4 bytes) | NODEDOWN(3) | |
| Address (4 bytes) | NODEDOWN(4) | |
| Address (4 bytes) | NODEDOWN(5) | |
| Address (4 bytes) | NODEDOWN(6) | |
| Address (4 bytes) | NODEDOWN(7) | |
| Address (4 bytes) | NODEDOWN(8) | |
| Address (4 bytes) | NODEDOWN(9) | |
| Address (4 bytes) | NODEDOWN(10) | |
| Address (4 bytes) | NODEDOWN(11) | |
| Address (4 bytes) | NODEDOWN(12) | |
| Address (4 bytes) | NODEDOWN(13) | |
| Address (4 bytes) | NODEDOWN(14) | |
| Address (4 bytes) | NODEDOWN(15) | |

It will be appreciated that the only significant change is the increase in the number of downwards pointers from four to sixteen. In all other respects, except in complexity of diagrammatic representation, the base 16 index tree may be used in exactly the same way as the base 4 tree. As has been noted above, a base 16 tree structure is the optimum digital tree structure and is the preferred practical embodiment.

What is claimed is:

1. A computer data storage management system for managing concurrent access to data files consisting of data entries referenced by keys comprising sequences of digits, the system including:

means for maintaining an index to each data file comprising a digital tree structure of index nodes hierarchically arranged according to the key structure and including at least downward pointers to lower-ranking nodes or to data entries of the data files, said pointers corresponding to possible values of an index digit;

index modifying means for modifying the index tree as necessary to reflect changes in data entries;

change indication means for providing an indication of predetermined types of modifications of the index tree or of a part thereof;

index search means for searching the index for a node containing a pointer to a user-supplied key in order to permit the reading of the data entry to which the user-supplied key refers; and means for examining said change indication to determine whether said index was modified by a concurrent access to the corresponding data file during the search of said index and for causing the index search means to repeat said search if a change was indicated during said search.

2. A system as claimed in claim 1 wherein the change indication means comprises a single change indicator for the whole of the index tree.

3. A system as claimed in claim 1 wherein the change indicator includes:

a counter, which is incremented in response to each predetermined modification of the index tree;

means for storing the value of the counter before the commencement of the search; and means for comparing the stored counter value with the current counter value to determine if a change has occurred.

4. A system as claimed in claim 1 wherein the change indication is only examined on completion of the search.

5. A system as claimed in claim 1 in which the change indication means includes a plurality of change indicators associated with different respective parts of the index tree and in which said search is repeated only if a change to one of the different parts of the index tree is indicated and then the search of that part of the index tree only is repeated.

6. A system as claimed in claim 1 wherein the index search means performs only read access to the index without locking of the whole or part of the tree.

7. A system as claimed in claim 1 in which said user-supplied key comprises a sequence of base $2^n$ digits, said tree comprising a base $2^n$ digital tree in which each index node contains a leading key value and $2^n$ pointers to each possible value of an index digit.

8. A system as claimed in claim 7 in which n is 4.

9. A system as claimed in claim 1 in which said change indication is provided only if a data entry is inserted in or deleted from said index.

10. A system as claimed in claim 1 in which said change indication is provided only if a data entry is deleted from said index.

11. A method of managing concurrent access to stored computer data files consisting of data entries referenced by keys comprising sequences of digits, said method comprising the steps of:

maintaining an index to each data file comprising a digital tree structure of index nodes hierarchically arranged according to the key structure and including at least downward pointers to lower-ranking nodes or to data entries of the data file, said pointers corresponding to possible values of an index digit;

modifying the index as necessary to reflect changes in data entries;

providing a change indication indicating the occurrence of predetermined types of modifications of the index tree or of a part thereof;

searching the index for a node containing a pointer to a user-supplied key in order to permit reading of the data entry to which the user-supplied key refers; and examining said change indication to determine whether said index was modified by a concurrent access to the corresponding data file during the search of said index and, if so, repeating said search.

12. A method as claimed in claim 11 in which the change indication is examined after the search.

13. A method as claimed in claim 11 in which said user-supplied key comprises a sequence of base $2^n$ digits, said tree comprising a base $2^n$ digital tree in which each index node contains a leading key value and $2^n$ pointers to each possible value of an index digit.

14. A method as claimed in claim 13 in which n is 4.

15. A method as claimed in claim 11 in which said change indication is provided only if a data entry is inserted in or deleted from said index.

16. A system as claimed in claim 11 in which said change indication is provided only if a data entry is deleted from said index.

17. A method as claimed in claim 11 wherein the step of providing a change indication comprises the steps of:

incrementing a counter incremented in response to each predetermined modification of the index tree;

storing the value of the counter before the commencement of the search; and comparing the stored counter value with the current counter value to determine if a change has occurred.

* * * * *